Dec. 2, 1930.   W. C. McCOY   1,783,851
ELECTRICAL INDICATING INSTRUMENT
Filed July 23, 1923   3 Sheets-Sheet 3
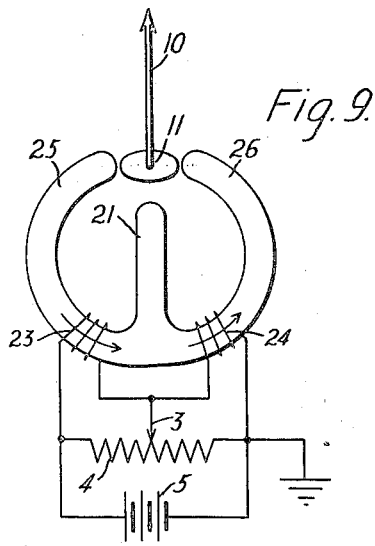
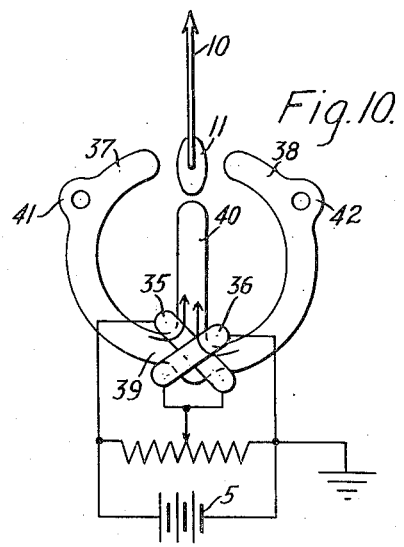
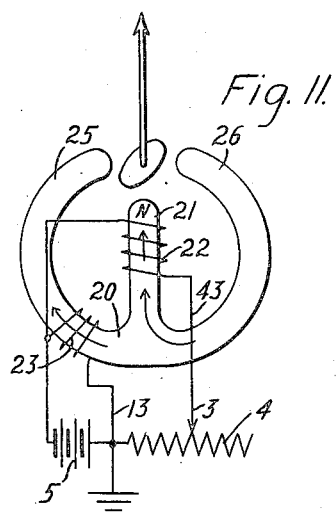
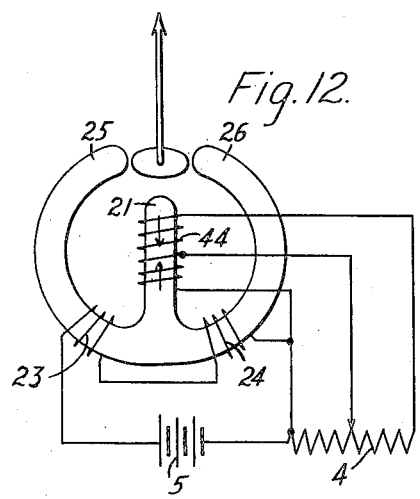
INVENTOR
William C. McCoy Patented Dec. 2, 1930

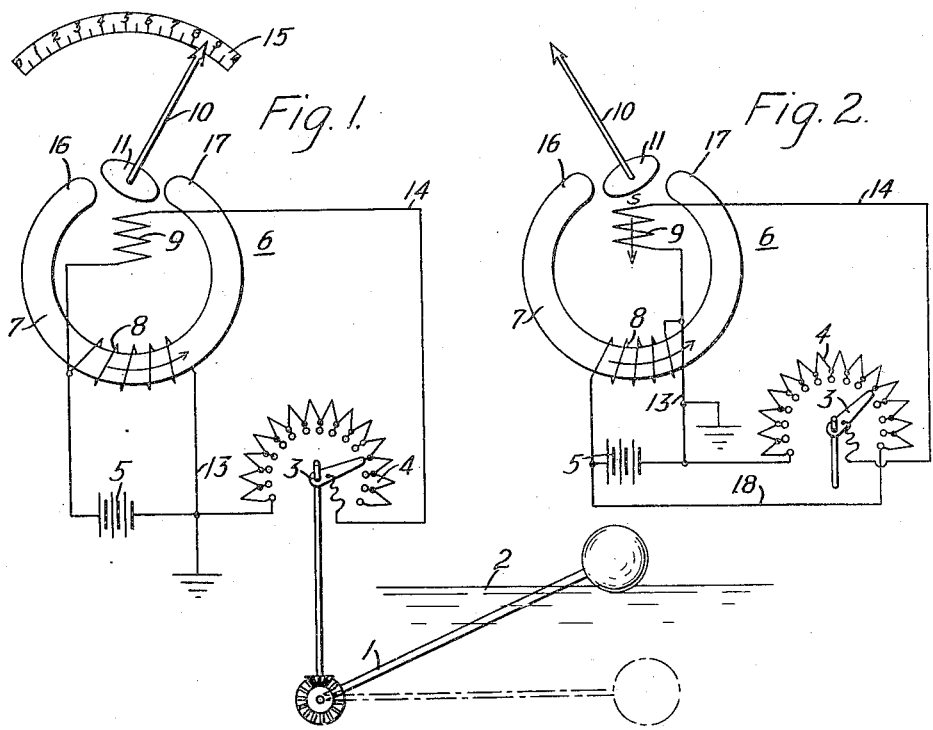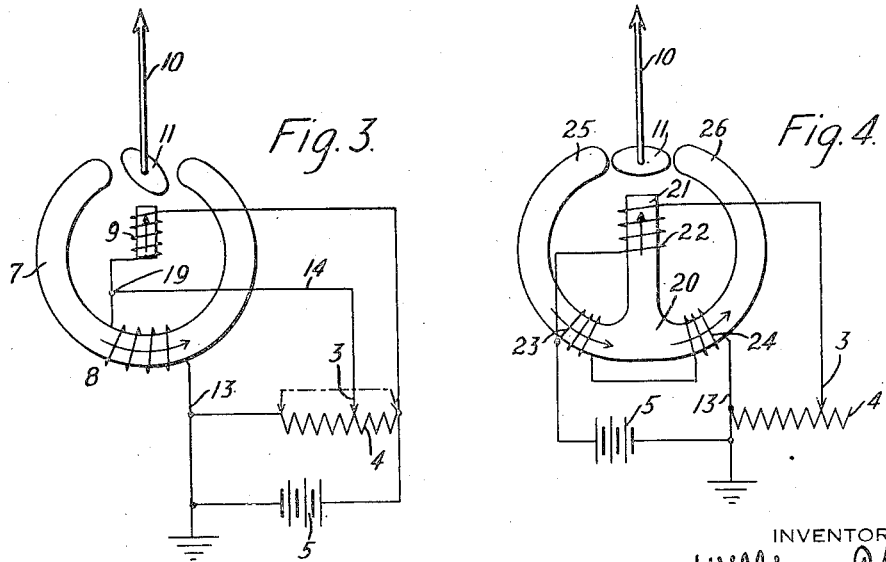

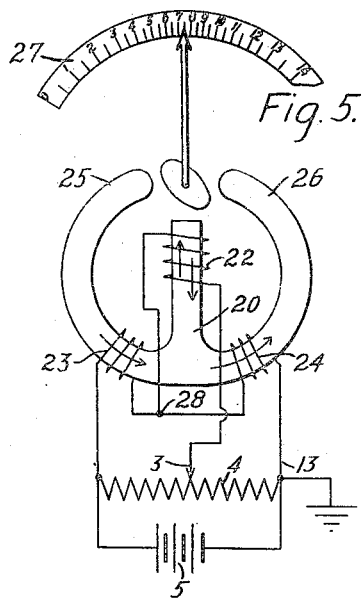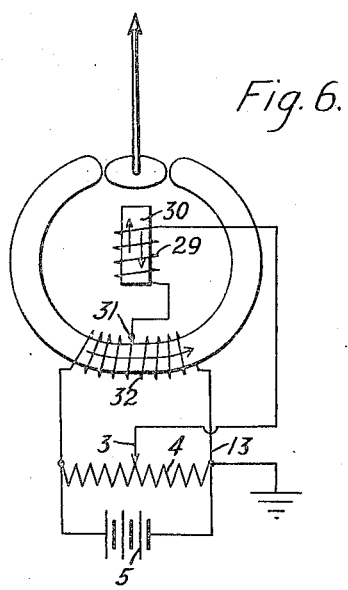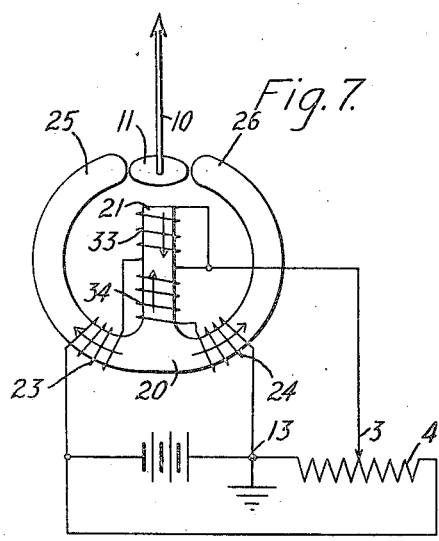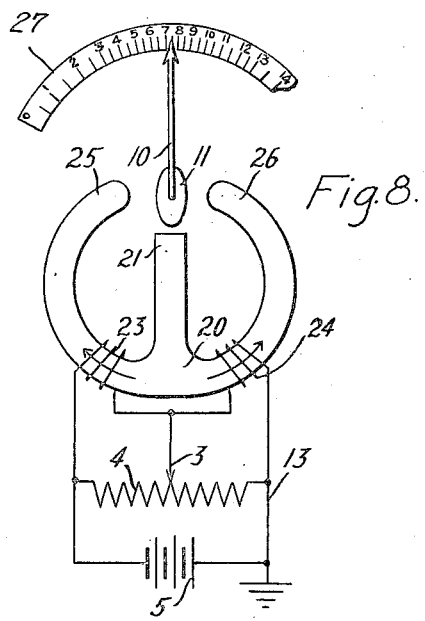

1,783,851

UNITED STATES PATENT OFFICE

WILLIAM C. McCOY, OF AKRON, OHIO, ASSIGNOR TO MOTO METER GAUGE & EQUIPMENT CORPORATION, OF LONG ISLAND CITY, NEW YORK, A CORPORATION OF DELAWARE

ELECTRICAL INDICATING INSTRUMENT

Application filed July 23, 1923. Serial No. 653,104.

This invention relates to gauges for indicating the level of gasoline in the tank of an automobile, and it particularly contemplates an improved gauge and a novel electrical control system therefor which provides an indicating system that is substantially independent of variations in the voltage of the electrical system of the car.

An additional object of this invention is to produce an indicating instrument that will be very rugged in its construction, relatively free from vibrations produced by the movement of the car, particularly positive in its operation, and inexpensive to construct. This invention furthermore contemplates a modification of almost any standard form of direct current voltmeter that will adapt the instrument to this particular service and that will render its indication independent of the applied voltage and dependent only upon the position of the movable contact of the rheostat that constitutes a part of the system.

An additional object of this invention is to utilize the residual magnetism of an iron circuit in an instrument of this general character for damping the operation of the indicator, particularly for use in connection with motor vehicles and particularly in order to absorb rapid variations in the position of the controlling rheostat by reason of the bobbing about of the actuating float.

Electrical gauges have heretofore been proposed for automobile fuel tanks but such gauges are either prohibitively expensive or their indications are responsive to fluctuations in the voltage of the automobile electrical system which makes their readings unreliable or their expense prohibitive.

This invention contemplates an improved form of electrically actuated gauge and an improved system of control therefor.

Referring particularly to the accompanying drawings:

Fig. 1 is a diagrammatic view of a gauge constructed in accordance with my invention together with the associated apparatus of the automobile with which it functions;

Figs. 2 and 3 diagrammatically illustrate modifications of the control system employed with the indicator shown in Fig. 1;

Fig. 4 is a modified form of both the instrument and the control system embodying my invention;

Fig. 5 is a diagrammatic view of an additional modification of the instrument and also a modified control system that is particularly adapted to accentuate the sensitiveness of the instrument over the zones at the respective ends of the indicator scale;

Fig. 6 is a further modification of the indicator and a particularly novel and useful control circuit therefor;

Fig. 7 is a diagrammatic view of the indicator and associated control circuit in which the instrument is particularly adapted to be used;

Figs. 8 to 10 inclusive are corresponding views of modifications of my invention employing only two exciting coils that are conveniently mounted; and Figs. 11 and 12 are diagrammatical views showing modified control circuits.

Fig. 1 of the accompanying drawings illustrates a particularly simplified form of my invention which incorporates a float mechanism 1 of conventional form that responds to the level of gasoline 2 in the fuel tank of the ordinary automobile and that moves an adjustable contact member 3 over a rheostat 4 that is energized from a storage battery 5 that constitutes a part of the equipment of the automobile.

An indicator 6, that will hereafter be described in detail, is mounted on the instrument board of the automobile, or otherwise remotely from the fuel tank, to indicate the level of liquid remaining in the fuel tank of the automobile.

The various individual elements of this system, except the indicator 6, constitute no part of my invention except in so far as they contribute to the operating system or comprise an operative element thereof.

The instrument 6 embodies a soft iron field piece 7 that is excited in accordance with the voltage applied from the battery 5 by means of an electromagnet coil 8 that is mounted thereon. I have herein referred to this field for this adaptation of my invention as the exciting field, and to the field produced by the electromagnet coil 9 as the actuating field because the former remains uniform for uniform battery voltages and the excitation of the latter varies in accordance with the position of the adjustable contact member 3 to control the indication of the instrument.

An indicator arm 10 is carried by a magnetic vane 11 of conventional construction that operates to swing the indicator over the scale 15 in accordance with the direction and independent of the intensity of the resultant magnetic field that is produced by coils 8 and 9.

Particular attention is invited to the fact that one terminal of the rheostat 4 is unconnected to the remainder of the system except through the agency of the movable contact member 3. The remaining terminal is connected to a common ground wire 13. This conductor can be dispensed with if the portions of the system which it connects are grounded on the frame work of the car or otherwise in accordance with customary practice. By grounding the points common to conductor 13 to the frame work of the car, it becomes necessary to extend only the one insulated conductor 14 from the rheostat to the instrument board whereas without this ground connection, one end of the rheostat must also be connected to the instrument board by conductor 13.

The swing of the indicator needle over the scale 15, that indicates the quantity of fuel remaining in the fuel tank, is of limited scope because the magnetization of neither the exciting field nor of the actuating field is reversed in direction by variations in the position of contact member 3.

The operation of this system will be self apparent. When the coil 8 is energized, it establishes a magnetic flux between the pole pieces 16 and 17 that tends to align the iron vane 11 with the flow of magnetic flux between the pole pieces. The vane 11 constitutes the actuated element of the instrument. As the energization of the coil 9 is increased by the movement of contact member 3 along the rheostat 4, the direction of the resultant field flux changes and this alters the position of the indicator. This action is very similar to the action of the well known volt meter having a permanent magnet field piece. The soft iron field piece 7, has its excitation varied in accordance with the applied voltage and thereby offsets the increased effort of the actuating coil to move the indicator a greater degree because of the increased voltage. The indications of the instrument are, therefore, substantially independent of battery voltage.

The operation of this system is substantially the same as for any voltmeter except that the exciting field is varied directly in accordance with the battery voltage in order to obtain indicator readings that are independent of the battery voltage. When the battery voltage increases, the exciting field that tends to hold the indicator in its extreme left hand position increases and the increase of the actuating field has no appreciable effect upon the indicator.

It should therefore be understood that the simplest and broadest aspect of my invention contemplates modifying any voltmeter embodying a permanent field exciting magnet by replacing that permanent magnet with an electromagnet energized in accordance with the voltage to which the system is connected. This will produce an instrument the indications of which will be substantially independent of variations in the voltage of the supply system.

Fig. 2 illustrates a modified form of the control system shown in Fig. 1 wherein both ends of the rheostat are connected to the battery 5 through conductors 13 and 18. In this instance conductor 13 may be readily replaced by a ground wire as in the previously described system. This is a more positive control of the energization of the actuating coil 9 but the system requires at least two conductors 14 and 18 in addition to the ground connection, that respectively extend from the ends of the rheostat 4 to the battery 5 and to the indicator 6.

The operation of this modification of my invention is substantially the same as for the proceeding instrument and system, the main difference being that this system of connection imposes a greater variation in the voltage applied to coil 9.

The control system shown in Fig. 3 is materially different from either of the preceeding systems in that it contemplates a simultaneous variation in the voltage applied to both the exciting and the actuating coils 8 and 9 of the instrument. As the voltage of the exciting coil 8 is increased, the voltage applied to the energizing coil 9 is decreased by the movement of the adjustable contact member 3 over the rheostat 4. In this system the conductor 14 that extends to the movable contact member 3, connects to the common point 19 of the coils 8 and 9, which are connected in series relation across the battery 5.

If the contact member 3 is moved from right to left over the rheostat 4, which is shown as a straight resistor for the sake of convenience, the initial position of the indicator needle 10 is in its extreme left hand position. This is produced by the energization of coil 8 by the full battery voltage and the short circuiting of coil 9 for this position of the contact member 3. It will also be appreciated that this position is entirely independent of the value of the voltage applied.

As the contact member 3 moves to the center of the rheostat, both coils 8 and 9 are energized to like degree, with the result that the indicator is held in substantially the position shown in Fig. 3. The indicator therefore takes the direction of the resultant magnetic field and, since this maintains its direction for all values of voltage, the indicator position is independent of the voltage of the electrical system of the automobile.

The extreme right hand position of the indicator is reached when the contact member 3 occupies its extreme left hand position, thus fully energizing the actuating coil 9 and short circuiting the exciting coil 8. This position is again independent of voltage variations.

Fig. 4 of the drawings illustrates a modified type of meter having a return path of magnetic material for the actuating coil. This relation is not obtainable with the usual form of instrument embodying a permanent magnet because of the lack of response of the exciting field strength to changes in the current traversing the exciting coil.

A soft iron field piece 20 has an inwardly extending tongue 21 that serves as a core for the actuating coil 22 that is mounted thereon. The exciting field is provided by coils 23 and 24 that are respectively carried by the two arms 25 and 26 of the field piece.

It will be seen from the drawing that the exciting and actuating coils of this instrument have a common magnetic core. This provides an instrument in which both fields can be made far stronger than with instruments employing no return circuit of magnetic material for the energizing coils. Substantially all of the exciting and actuating flux is directed without leakage losses to the precise place where it is needed. The field being much stronger than is practicable in other types of instruments, produces more accurate and positive deflections, particularly toward the ends of the scale.

A further modification of my invention is shown in Fig. 5 wherein I have doubled the deflecting range of the indicator by reversing the polarity of the pole piece 21 between extreme positions of the contact member 3, and rendered the instrument more accurate over the two ends of the scale which are the important zones, indicating as they do the "empty" and "full" condition of the fuel tank. It is important in this connection, to note that the divisions at the extremities of the scale 27 are larger than the corresponding divisions in the central zone of the scale.

The connection of coils 23 and 24 in series relation across the battery 5 is as before described but the rheostat 4 is, in this instance, connected directly across the battery. The coil 22 has one terminal connected to the common point 28 of coils 23 and 24 and the other terminal connected to the contact member 3 of the rheostat.

This instrument therefore contains a single actuating coil 22 that reverses the polarity of the middle core piece 21 for the extreme positions of the rheostat. In the position shown, the common point 28 of the several coils is of substantially the same voltage as the point of contact of member 3 with the rheostat 4. Since coils 23 and 24 are of substantially the same resistance, the point of connection that is common to both coils will be of substantially the same voltage as the mid-point of the rheostat and therefore no current will flow through the actuating coil 22 for this position of the member 3. Positions on one side of the central point of the rheostat cause the actuating coil 22 to be energized in one direction and positions on the other side of this point reverse its direction of energization.

A very material additional advantage that is present in this form of electrical system is the total absence of inductive spark at the point of contact of the member 3 with the rheostat. Interrupting the circuit at any time at this point would give no inductive spark whereas in other circuit arrangements a spark might result from inductive effects. The proximity of the rheostat to the fuel tank renders this important.

It will also be apparent that certain of the advantages of this system of connection could be obtained without employing the completed magnetic circuit for the actuating coil. Such an instrument is shown in Fig. 6 which illustrates an actuating coil 29 that has a separate iron core 30, and that is connected between a centrally located tap 31 of the exciting coil 32 and the movable contact member 3 of the rheostat.

These principles can also be utilized to advantage in the circuit arrangement shown in Fig. 7. In this instance the soft iron core 20 is constructed as before with a central leg 21. Exciting coils 23 and 24 are respectively connected in series with actuating coils 33 and 34 which are connected differentially and are mounted on the middle leg 21 of the core. The direction of the arrows in the figure show the preferred relative directions of the magnetic flux produced by each of the coils.

When the movable contact member 3 occupies one extreme position, coil 33 predominates and produces, when combined with the flux produced by the exciting coils 23 and 24, a resultant magnetic flux that is substantially at an angle of 45° for the central position of the contact member 3, coils 33 and 34 neutralize each other and the exciting field predominates as shown in the drawing, and when the contact member is moved to its other extreme position, the magnetic vane turns an additional 45° in the same direction to alignment with the resultant magnetic field. These positions are again independent of the value of the applied voltage.

A greatly simplified form of my invention is shown in Fig. 8. The magnetic core 20 has the previously described central arm 21. This instrument only employs two energizing coils 23 and 24. These coils may either be connected in opposed relation as indicated by the arrows in Fig. 8 or in cumulative relation as in Fig. 9.

Referring particularly to Fig. 8, when the contact member 3 is in its extreme left hand position, coil 23 is short circuited and coil 24 energizes pole pieces 21 and 25 as negative and pole piece 26 as positive. When both coils are equally energized, pole piece 21 is negative and poles 25 and 26 are positive. For the other extreme position, coil 24 is short circuited and coil 23 positively energizes pole piece 25 and negatively energizes pole pieces 21 and 26. It will therefore be seen that the field flux in this instance is reversed during the rotation of the field of the instrument giving a very wide range to the instrument with a minimum number of coils. Fig. 9 shows a corresponding system in which both field coils 23 and 24 are wound to produce the same direction of field flux. In this instance the energization of the central leg 21 is reversed during the movement of contact member 3, because of its relation to the two coils 23 and 24. The operation of this system will be readily apparent.

Fig. 10 illustrates a particularly valuable application of this invention wherein only two coils are employed with substantially the same results as obtained in the instruments shown in Fig. 8 and Fig. 9.

The coils 35 and 36 are preferably of such flexible form that they may be respectively slipped over the pole pieces 37 and 38 that form two arms of the magnetic core 39 which also has a central leg 40. Coil 35 is first mounted in the position shown, then coil 36 is placed over coil 35 and is retained in place by the close fit to the core or by dipping the assembled core and coils into a bath of shellac or varnish. The size and number of turns of the coils 35 and 36 permits them to pass over the enlarged portions 41 and 42 that form ears for the convenient mounting of the instrument on its supporting frame, in accordance with conventional practice. The cross sectional area of each of the pole pieces 37, 38 and 40 is substantially the same for all points along their length in order that their permeability will be substantially the same.

The direction of the arrows indicate a preferred direction of energization, but it is apparent that either direction of energization of the coils will operate the gauge. In one relative direction of energization the polarity of the central leg is reversed and in the other, the field magnetization is reversed. The core shown has been found to be a particularly beneficial shape from an operating and a manufacturing standpoint.

Fig. 11 shows a form of instrument in which the direction of field produced by the middle leg 21 of the core 20 is reversed and in which only one conductor 43 is required from the rheostat to the instrument board if a grounded system is employed.

The coil 23 is connected across the battery and it maintains the pole piece 25 at substantially constant magnetization for a definite value of the voltage. When the contact member 3 is in its extreme left hand position, coil 22 is inactive and a pole opposite in sign to pole piece 25 is produced in pole pieces 21 and 26. When the contact member 3 is in the position shown, pole pieces 21 and 25 are of like sign and pole piece 26 is of different sign.

Coil 22 opposes the polarity established by coil 23 and as its energization increases it overcomes and then reverses the direction of polarity of the central leg of the core member. This point occurs at the same position of contact member 3 for all voltages because of the relative value of the two coils. Positions beyond this point reverse the energization of the middle leg 21 of the core.

Fig. 12 is an additional modification of my invention employing a single coil 44 having opposed sections, and mounted on the middle leg 21 of the core. The operation of this instrument will be self apparent.

Although I have illustrated the principle of my invention by means of a series of examples, other modifications are apparent, and I desire, therefore, that only such limitations shall be imposed on my invention as are indicated by the spirit and scope of the appended claims.

What I claim is:

1. An electro-magnetic instrument, comprising a normally unmagnetized magnetizable core having a pair of opposed pole pieces and an intermediate, third pole portion, a pair of differentially magnetizing windings energized respectively mounted on said opposed pole pieces and adapted to magnetize said third pole portion in opposed relation, and a magnetically responsive armature pivotally mounted at its magnetic center and actuated to a multiplicity of stable indicating positions by the combined magnetic influence of said pole pieces and said third pole portion, and means for energizing said windings.

2. An electro-magnetic instrument coming a normally unmagnetized core member of magnetizable material having a pair of opposed converging magnetizable leg portions and a third portion forming a resultant magnetic pole, means for differentially energizing the leg portions, and a magnetic vane pivotally mounted at its magnetic center for actuation to a multiplicity of stable indicating positions by the combined influence of the magnetic flux emanating from said leg portions and said resultant magnetic pole.

3. An electro-magnetic instrument comprising a normally unmagnetized core member of magnetizable material having a pair of of opposed converging leg portions, a pair of differentially energized magnetizing windings respectively mounted on different leg portions of said core and electrically connected in opposed relation, and a magnetic vane actuated by the combined magnetic influence of said magnetizing windings to a multiplicity of stable indicating positions, said magnetic vane being pivotally mounted to swing about its transverse axis.

4. An electro-magnetic instrument comprising a normally unmagnetized core of magnetizable material having three distinct leg portions, means for differentially energizing the leg portions of said core to varying degrees, and a magnetically responsive armature pivotally mounted to swing about its geometric axis and actuated by the combined magnetic flux emanating from said leg portions to a multiplicity of stable indicating positions.

In witness whereof, I have hereunto signed my name.

WILLIAM C. McCOY.